Oct. 12, 1948.      B. W. COPELAND      2,450,938

AUTOMATIC SHUTOFF VALVE

Filed June 24, 1946

INVENTOR.
B. W. Copeland
BY Scott L. Norvell
Attorney

Patented Oct. 12, 1948

2,450,938

UNITED STATES PATENT OFFICE 2,450,938

AUTOMATIC SHUTOFF VALVE

Brooks W. Copeland, Prescott, Ariz.

Application June 24, 1946, Serial No. 678,915

2 Claims. (Cl. 226—127)

This invention pertains to automatic shut-off valves for use on the ends of gasoline delivery pump hoses.

One of the objects of my invention is to provide a combined valve and delivery spout which can be inserted into the filling pipe of an automobile gasoline tank so that flow of gasoline into the tank will be cut off when the fluid in the tank reaches a predetermined level.

Another object is to provide a delivery valve having a flexible synthetic rubber spout adapted for insertion into an automobile gasoline tank filling spout, provided with a main gasoline delivery channel, and an auxiliary air passageway arranged so that back pressure of air in said auxiliary tube caused by the immersion of said nozzle in fluid will trip the valve and shut off the flow of liquid in said main channel.

A further object is to provide a gasoline tank filling hose cut-off valve with a flexible electrically conductive synthetic rubber spout adapted to prevent the accumulation of static electricity between the delivery hose and the car being filled.

A still further object is to provide an automobile gasoline filling hose with a cut-off valve operative primarily by a pneumatic actuating device and secondarily by the flow of gasoline through the valve.

Other objects will appear hereinafter.

I attain the foregoing objects by means of the devices shown in the accompanying drawings in which—

Figure 1:
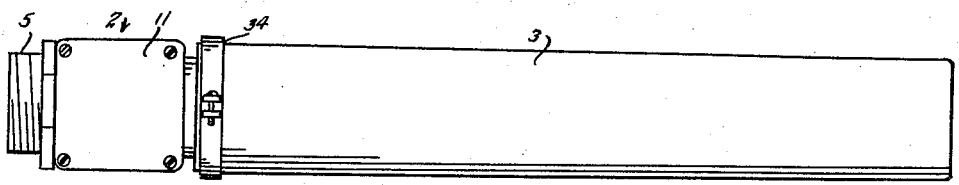
Figure 2:
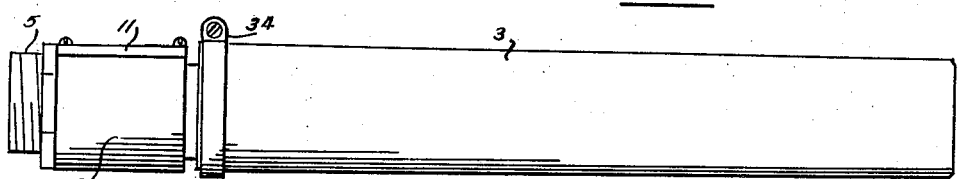
Figure 5:
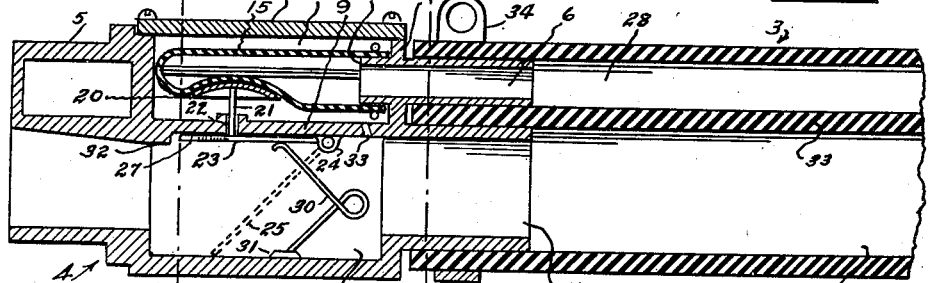
Figure 3:
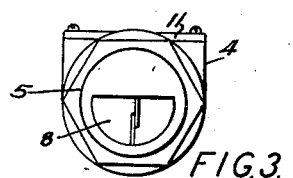
Figure 4:
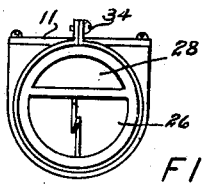

Figure 1 is a plan view of my valve and nozzle;

Figure 2 a side elevation thereof;

Figure 3 an end view of the intake and of the valve;

Figure 4 an end view of the delivery end of the nozzle;

Figure 5 a sectional elevation of the valve and a portion of the nozzle drawn on an enlarged scale.

Figure 6:
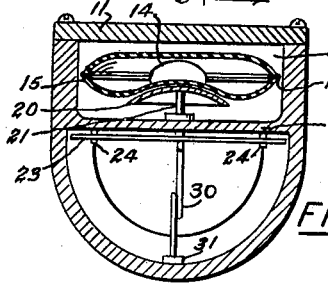

Figure 6 a cross section thereof taken on line 6—6 of Figure 5, and

Figure 7:
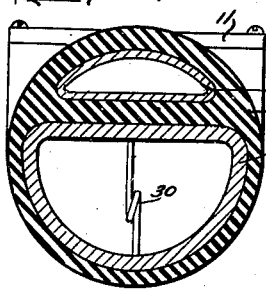

Figure 7 a cross section taken on line 7—7 of Figure 5.

Similar numerals refer to similar parts in the several views.

Numeral 2 refers to the valve and numeral 3 to the nozzle which is attached to the outer end of the valve.

The valve is contained within a case 4 which has a threaded nipple 5 at the inner end adapted to attach to the outer end of a standard manually operated gasoline delivery valve. At its outer end the valve case has two semi-circular force fit nipples 6 and 7 adapted to fit into the two channels of nozzle 3.

The under portion of valve casing embraces a semi-circular channel 8. Above this is a partition plate 9, and above this there is a rectangular bulb compartment 10 closed by a plate 11.

The semi-circular nipple 6 leads through the end wall 12 of the case 4 to an oval tube 14 within bulb compartment 10. The neck of a collapsible and inflatable bulb 15 made of thin neoprene is attached to this nipple. This bulb is made with a horizontal seam 16 by thickening the material around its perimeter so that upon inflation most of the expansion is vertical.

On the floor of compartment 10 there is a domed pressure plate 20 mounted on top of a stem 21 and operative in a hole 22 in plate 9. The lower end of this stem normally contacts the upper face of the clapper type valve 23 which is hinged on tabs 24 so as to swing downward across channel 8 to the position indicated by dotted lines 25 to effect a closure thereof.

This valve is made of thin metal with its inner edge 26 straight and its outer edge 27 rounded to conform to the shape of the bottom of channel 8 along the area of contact when the valve is in closed position.

A spring 30 of light spring wire, is anchored in a tab 31 on the inner wall of channel 8 and bears on this underside of valve 23 normally holding it in open position. In this position the outer edge 27 of the valve rests in a recess behind a shelf 32, and out of the flow channel 8. When in this open position the top face of valve 23 contacts stem 21 so as to elevate plate 20 forcing it somewhat into the bag of bulb 15.

Flow channel 8 connects with the semi-circular nipple 7 which fits into the gasoline delivery channel 27 of nozzle 3. Nipple 6 connects to air pressure channel 28.

Nozzle 3 has a substantially tubular outer wall tapering toward the outer end. The interior is divided into the two channels above mentioned by a partition 33. The inner end of the nozzle fits over the two valve nipples 6 and 7 and is held in place by clamp 34.

In use this valve is connected to the delivery outlet of a manually operated gasoline delivery hose valve by nipple 5. Nozzle 3 is inserted into the filling spout of an automobile gasoline tank. This nozzle is molded of neoprene so as to prevent accumulation of static electricity and to be sufficiently flexible to extend down into the gasoline spout and into the tank to a level to which the tank is to be filled. Being flexible, the nozzle will follow the bends of the spout to reach this level.

The manual valve is used to control the delivery flow of gasoline to fill the tank. When the gasoline fills the tank to the "full" level, it submerges the outer end of nozzle 3, and as filling proceeds, creates a back pressure of air in channel 28. This inflates bulb 15 which fills compartment 10 presses downward on plate 20.

Since the bulb is made of very light material, a very slight pressure is sufficient to inflate it and actuate the pressure plate. This action causes a slight downward movement of the pressure plate and this is imparted to valve 23. This movement is sufficient to move valve 23 outward from its recess behind shelf 32 whereupon it is caught by the flow of gasoline thru channel 8 and forced to closed position 25.

This sudden cut-off of the flow of gasoline causes a surge and jolt which easily attracts the attention of the operator of the manual valve. The manual valve is then closed and the nozzle partially withdrawn from the tank sprout. A slight amount of leakage takes place along the inner flat edge 26 of valve 22 and this releases the gasoline pressure between it and the manual valve so that it recloses under the urge of spring 30, and gasoline remaining in the nozzle and valve parts drains into the automobile tank. A drain hole 33 drilled angularly in the direction of flow thru channel 8 draws out any gasoline leaking into compartment 10 thru hole 22.

From the foregoing, it will be apparent that I have provided a valve which may be used as a safety precaution, in addition to the ordinary delivery valve, to prevent overflow of tanks when filling. This eliminates waste of gasoline and the fire hazard attendant to spilling and overflow.

Having now fully described my invention and explained its use, I wish to be limited only by the following claims.

I claim:

1. A shut-off valve for gasoline delivery hoses comprising a valve body and a flexible nozzle thereon having a gasoline delivery channel and an air pressure channel; said valve body having a gasoline flow channel connected to said gasoline delivery channel and a bulb compartment having a bulb connected to said air pressure channel, a hinged clapper valve operative in said flow channel and arranged to close in the direction of gasoline flow thru them, and a spring normally holding said valve in opened position out of said gasoline flow channel; a pressure plate operative in said bulb compartment, having a stem in operative relation to said valve; an inflatable bulb connected with the air pressure channel of said nozzle positioned in said bulb compartment and arranged to move said pressure plate stem against said valve tab when inflated so as to initiate closing movement of said valve when back pressure of air is applied by immersion of said nozzle; said valve being arranged so that the said initial closing movement positions it in said flow channel whereby flow of gasoline therethrough forces it to fully closed position.

2. A shut-off valve for gasoline delivery hoses comprising a valve body and an attached delivery nozzle provided with a gasoline delivery channel and an air pressure channel; said valve body having a flow channel connected to said delivery channel in said nozzle, and a bulb compartment partitioned therefrom; a clapper type valve operative in said body flow channel and arranged to close in the direction of gasoline flow therethrough; a valve spring normally holding said valve in opened position; a pressure plate having a depending stem, operative in said bulb compartment, and normally held in raised position by contact with the top face of said valve, and inflatable bulb in said bulb compartment connected to the air pressure channel in said nozzle; said parts being arranged so that when said nozzle is immersed in a fluid pressure of air entrapped in said nozzle air pressure channel will inflate said bulb whereby said clapper valve is moved into said flow channel by said pressure plate and stem whereupon the flow of gasoline through said channel forces said valve to closed position.

BROOKS W. COPELAND.

REFERENCES CITED

The following references are of record in the file of this patent:

UNITED STATES PATENTS

| Number | Name | Date |
|---|---|---|
| 2,310,631 | Hansen | Feb. 9, 1943 |
| 1,550,738 | Payne | Aug. 25, 1925 |